June 1, 1937.  H. MIGNET  2,082,172
AEROPLANE
Filed April 16, 1936  3 Sheets-Sheet 1
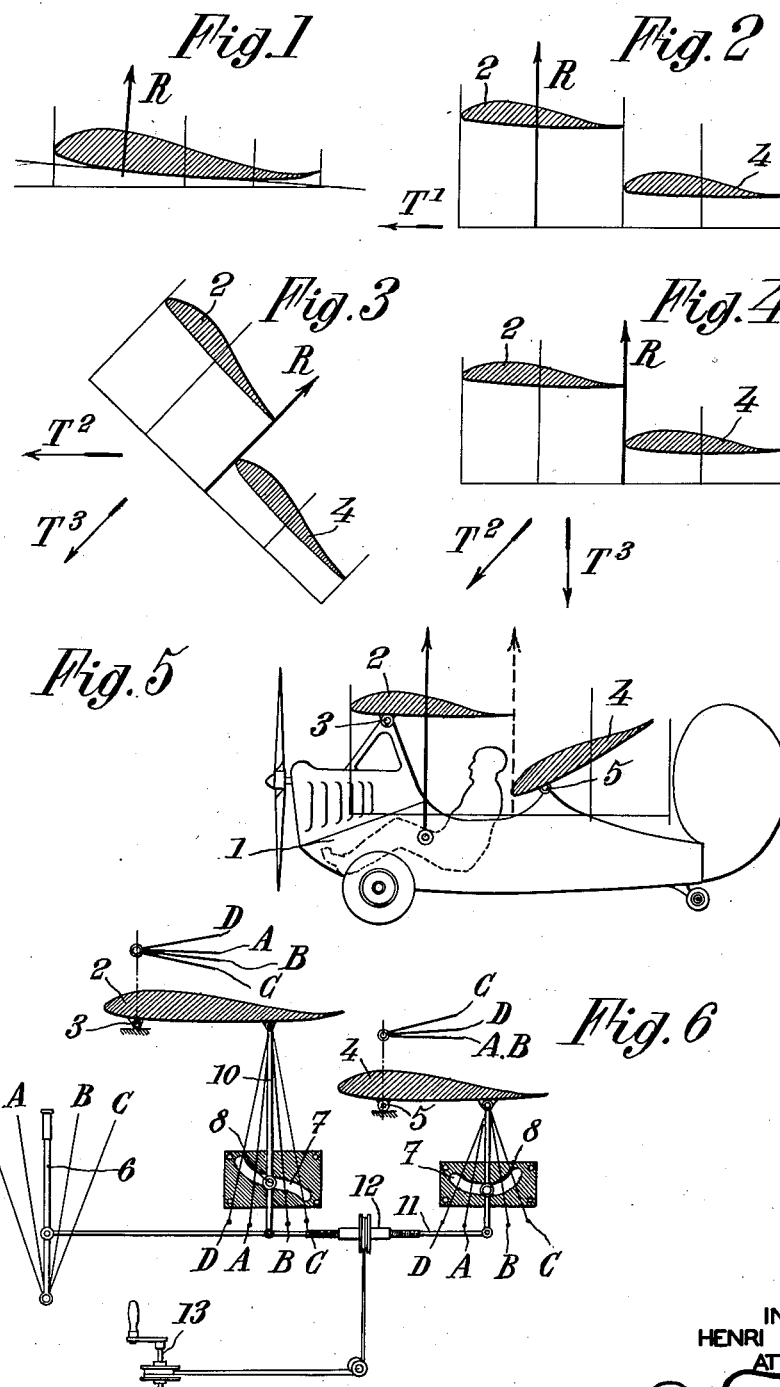
INVENTOR
HENRI MIGNET
ATTORNEYS

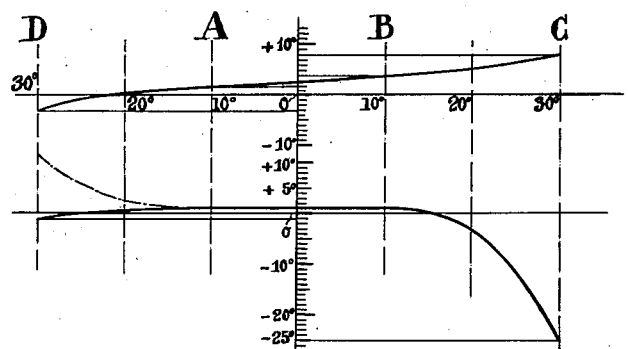
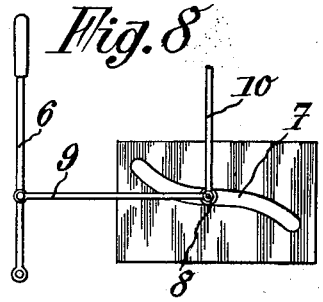
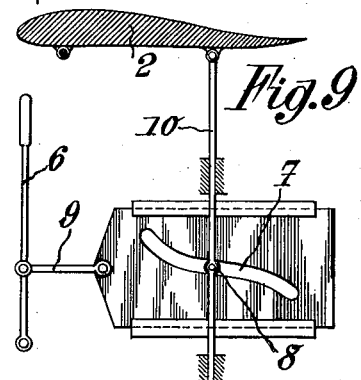
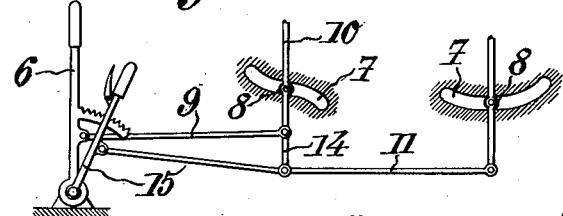
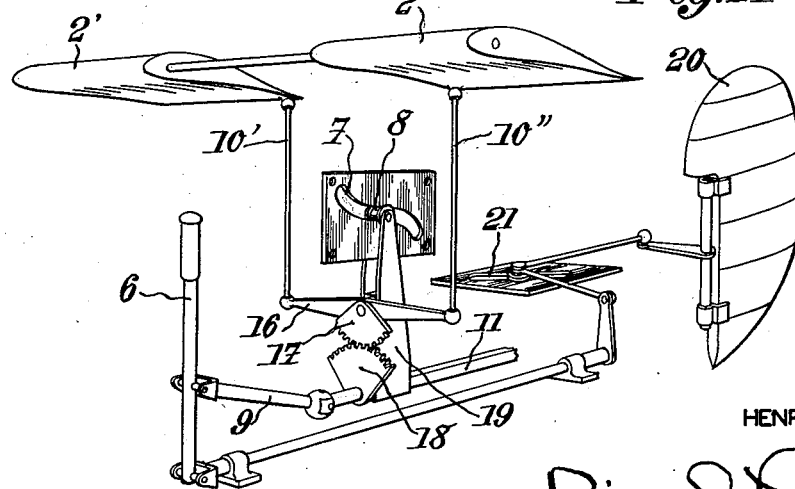

June 1, 1937.                H. MIGNET                2,082,172
                              AEROPLANE
          Filed April 16, 1936          3 Sheets-Sheet 3

INVENTOR
HENRI MIGNET
ATTORNEYS

Patented June 1, 1937

2,082,172

UNITED STATES PATENT OFFICE 2,082,172

AEROPLANE

Henri Mignet, Meaux, France

Application April 16, 1936, Serial No. 74,769
In Belgium April 26, 1935.

16 Claims. (Cl. 244—48)

The present invention relates to aeroplanes and it is more particularly, although not exclusively, applicable to aeroplanes provided with at least two aerofoils arranged in tandem at least one of which is of variable incidence.

It should be noted that, in the following description and claims, the expression aerofoil or wing "of variable incidence" includes both an aerofoil or wing made of a single element the whole of which is rotatable about an axis at right angles to the fore and aft direction of the aeroplane, and an aerofoil or wing at least a portion of which is of deformable chord section, for instance a wing consisting of a stationary main part and movable flaps or ailerons on the trailing edge.

The principal object of the present invention is to improve such aeroplanes in such a manner that they fulfil the various requirements of practice better than at present.

According to the present invention, aeroplanes embodying at least two aerofoils arranged in tandem and disposed in such a way that the angles of incidence of the said aerofoils, or of two of them where more than two are provided, may be modified, preferably by the operation of a single control, are characterised in that the means for controlling the variations of the angles of incidence of the aerofoil are such that, during at least part of the movement which increases the angle of incidence of the front movable aerofoil, the angle of incidence of the rear movable aerofoil is diminished.

A further feature of the invention, which is applicable to aeroplanes comprising at least two variable incidence surfaces arranged one behind the other, consists in connecting the said surfaces to a single control member in such a manner that for a complete stroke of the said operating member the laws of variation of incidence of these two surfaces differ from one another, the variations of incidence of the rear surface being, for certain positions of the control member, in the opposite direction to those for the front surface.

A still further feature consists in interposing between the movable surface of an aeroplane and its operating member, a cam system permitting a given ratio to be obtained for each position of the operating member between the elementary displacements of the said operating member and those of the movable surface.

Another feature of the present invention relates to flying machines including an aerofoil or wing the two portions of which that are located respectively on either side of the longitudinal plane of symmetry of the machine are of variable incidence, this incidence being variable either in the same direction for both of these portions (so as to cause the aeroplane to turn about a transverse axis, as under the effect of an elevator), or differentially, in opposite directions (so as to cause the aeroplane to roll on its longitudinal axis). According to this feature, the means for controlling the variable incidence of these portions of the wing are devised in such manner that the amplitude of the differential variations of incidence permitted by said control means is more and more limited as the common variation of incidence of both portions of the aerofoil (elevator-like action) is more considerable in the direction that tends to turn the nose of the aeroplane upwards.

In order that the nature of the invention may be more clearly understood, reference will now be made to the accompanying drawings, in which:—

Figs. 1 to 4 are explanatory diagrams to which reference will be made to facilitate an understanding of the invention.

Fig. 5 illustrates an aeroplane comprising two aerofoils in tandem constructed according to one embodiment of the invention.

Fig. 6 shows, diagrammatically, parts of the same aeroplane including the means for controlling the variation of incidence of the aerofoils.

Fig. 7 comprises two explanatory curves.

Figs. 8 to 10 show certain variations of construction of certain of the parts shown on Fig. 6.

Fig. 11 shows diagrammatically, in perspective, parts of an aeroplane constructed according to another embodiment of the invention.

Figure 12:
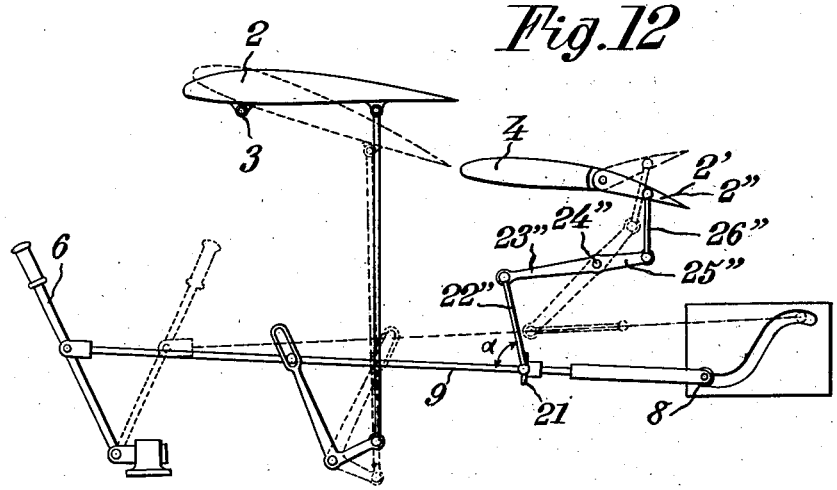

Fig. 12 is a diagrammatical view showing the essential elements of an aeroplane made according to still another embodiment of the invention.

Figure 13:
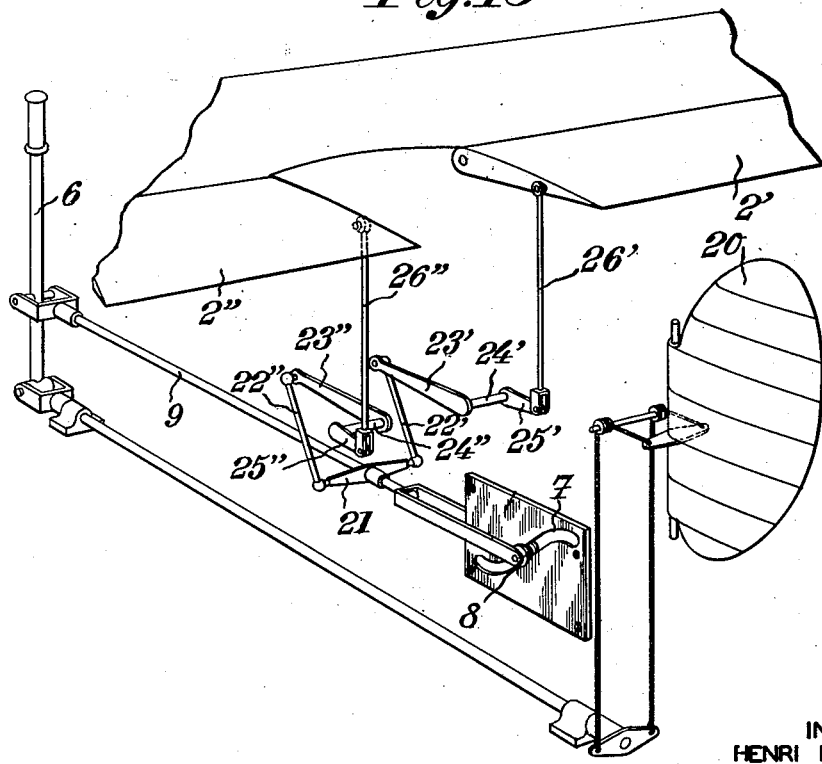

Fig. 13 is a perspective view corresponding to Fig. 12.

The invention will be further described with reference to an aeroplane of the type shown in French Patent No. 757,605, comprising two tandem aerofoils, the front aerofoil having a variable incidence and constituting the essential member for controlling the evolutions of the aeroplane and the area of the rear aerofoil being substantially of the same order of magnitude as that of the front aerofoil, the phrase "of the same order" being employed in this case to distinguish from aircraft comprising a principal wing and a tail unit but it includes cases where the surface of the rear aerofoil differs considerably from that of the front aerofoil, for example in which the ratio of these two areas is about ¼, the front aerofoil being either smaller or, preferably, larger. The aeroplane is arranged in any suitable manner, for example by articulating to the fuselage 1, on the one hand, a front aerofoil 2 around a transverse axis 3 and, on the other hand, a rear aerofoil 4 around a transverse axis 5, this rear aerofoil being arranged slightly below the front aerofoil 2.

Means are provided for controlling the angles of incidence of these aerofoils, these means being such that at least during part of the movement of increasing the angle of incidence of the front aerofoil, it is possible to diminish that of the rear aerofoil. Although it is possible to construct the said means by employing two distinct control members, use is advantageously made of a single control member, for example a lever or control stick 6 which is connected in such manner to the aerofoils 2 and 4 that the laws of variation of incidence of these aerofoils differ one from the other, these laws being determined by taking account of the following considerations:

It is known that when the angle of incidence of an auto-stable aerofoil of well known form (Fig. 1) increases relatively to the path of movement, the centre of pressure of this aerofoil moves to the rear.

Similarly, in the case of an aeroplane having several aerofoils, for example a front aerofoil 2 and a rear areofoil 4 (Figs. 2 to 4), the centre of pressure is towards the front part of the assembly for a path $T^1$ (Fig. 2) corresponding to small angles of incidence. However, the centre of pressure moves to the rear when the angle of incidence increases. Thus the centre of pressure is located towards the centre of the chord of the assembly of the two aerofoils for paths $T^2$ and $T^3$ (Figs. 3 and 4) corresponding to large angles of incidence which may reach 90°, this latter case being that of oblique descent with the engine in operation according to the path $T^3$ (Fig. 3) or of vertical descent without the engine according to the path $T^3$ (Fig. 4).

In order that flight with these great angles of incidence or the so-called parachute flight is possible both with and without the engine, it is necessary that if the wing system of the aeroplane is not to be changed at all, the centre of gravity must be moved more to the rear than for the flight according to the path $T^1$ in order that this centre of gravity remains on the continuation of the resultant R of the aerodynamic forces exerted on the aeroplane, provided that the disturbing action due to the fact that when the engine is in operation the traction thereof does not necessarily pass through the centre of gravity of the aeroplane, is disregarded.

However, it is possible to realize equilibrium for the various angles of approach of the aeroplane by acting on the angles of incidence of the two aerofoils or even on that of the rear aerofoil 4 alone.

Thus when, without modifying the angle of incidence of the aerofoil 2, the angle of incidence of the aerofoil 4 is diminished, if necessary to such an extent as to make it negative to a high degree (Fig. 5), the desired equilibrium for parachute flight is attained at every angle of incidence of the aerofoil 4 less than that giving normal horizontal flight corresponding to a more or less oblique descent.

The amplitude of the movements of the rear aerofoil 4 or of its trailing edge flaps is relatively great and may even attain several tens of degrees contrary to the amplitude of the movement of the front aerofoil 2, which is generally only some fractions of a degree.

The functions of the two movable aerofoils will, in fact, be very different, the front aerofoil ensuring the permanent control of normal flight while the rear aerofoil which can, it is understood, in normal flight have merely a secondary rectifying function by movements of small amplitude, will, however, be considerably displaced for flight with great angles of incidence.

In other words, in normal flight the front aerofoil will have a stabilizing function, the rear aerofoil having a mainly sustaining action, while in parachute flight the front aerofoil, which can only have a small movement, will have a principally sustaining action while the rear aerofoil will have mainly a stabilizing action by movements of large amplitude. In these two cases where the aerofoils change their function, the efficiency of the stabilizing aerofoil responds to the instantaneous control of the pilot in flight, contrary to what occurs with aircraft of the well known form.

Account being taken of what has been stated above, the laws of variation of incidence of the aerofoils 2 and 4 are advantageously regulated in such a way that during normal flight the lever 6 actuates the front aerofoil principally, which will be displaced for example between the two positions A and B of Fig. 6 and during parachute flight the rear aerofoil will be actuated principally and will be moved so as to have a considerably negative angle of incidence C (for example −25°) while the angle of incidence of the front aerofoil is increased (for example up to +6°).

Preferably, between these two extremes, the action of the lever 6 on the two aerofoil will vary in a continuous manner in such a way as to obtain a progressive effect.

Finally, for rapid cruising flight (forward position of the lever 6), it may be provided that either the angles of incidence of the two aerofoils will be simultaneously diminished as far as D (Fig. 6) or the incidence of the front aerofoil will decrease gradually while that of the rear aerofoil increases (eventually assuming substantial positive values, for instance from 1° to 15°).

Thus, the connection between the lever 6 and the aerofoils 2 and 4 may be such that laws of variation of incidence of the kind represented by the curves of Fig. 7 are obtained, the upper and lower curves relating respectively to the front aerofoil and to the rear aerofoil and being obtained by plotting as abscissae the displacements of the lever 6 on the two sides of the mean position 0 of the lever and as ordinates the angles of incidence of the aerofoils 2 and 4.

Although the connection between the lever 6 and the aerofoils may be ensured by any suitable means, it would, however, appear advantageous to make use, for this purpose, at least for controlling one of the aerofoils (preferably the rear aerofoil), of a cam of the type represented on Fig. 8, that is to say constituted by a slide 7 adapted to guide a spindle 8 in such a way as to produce the appropriate displacements of this member in a direction forming an angle with the direction of the relative displacements imposed on the slide 7 and on the spindle 8.

According to conditions, either the spindle 8 is connected, directly or indirectly, to the lever 6, for example by a connecting rod 9, the slide 7 then remaining fixed (Fig. 8), or the said slide is mounted in guides and is connected to the lever 6 by the connecting rod 9 (Fig. 9). The spindle 8 is, in any case, connected to the aerofoil, for example to the rear of the axis of articulation of this latter, by a connecting rod 10, preferably substantially perpendicular to the connecting rod 9. Thus, any movements of the aerofoil when the spindle 8 is displaced from the front to the rear of the slide 7 depend solely on the profile of the said slide and any desired law may be obtained for the reversible transmission of the movement.

It should be understood that the slide 7 could have any suitable form, such as a slot cut in a sheet of metal, a curved rod of desired form, or the like. Similarly, the spindle 8 could either comprise the articulation between the connecting rods 9 and 10 (Fig. 8) or it may be situated at any other point, for example on one of the connecting rods (Fig. 6).

By reason of such an arrangement it is possible either to connect the front aerofoil to the lever 6 in the usual way by levers, cables or rigid rods and to make use of a cam for controlling the rear aerofoil, or use may be made of a cam or other device giving similar effects, for controlling each of the aerofoils (Figs. 6 to 10), the said cam or other device being such that it is possible to realize a control system fulfilling all the required conditions and, in particular, permitting the laws of variation of the angle of incidence indicated on Fig. 7 to be obtained.

The incidences A, B, C and D corresponding to the notation of Fig. 7, have been shown above each of the two aerofoils in Fig. 6.

It should be noted from Fig. 7 that for normal flight the angles of incidence are only slightly modified for relatively great displacements of the lever 6 in the zone utilized for this type of flight, which makes the piloting more pleasant.

In any case, a connecting rod 11 may serve to couple the two slide devices, the connection between the two aerofoils being either always the same or adjustable as required.

In order to permit this adjustment, it is possible, for example, to make the length of the connecting rod 11 variable by making use of any suitable device such as a strainer 12 provided with inversely screwed portions and operable by a crank 13 (Fig. 6). Alternatively it would be possible to employ a crank constituted by a finger 14 articulated on the one hand to the connecting rod 10 operating the front aerofoil and, on the other hand, to the front extremity of the connecting rod 11, the angular position of the said finger relatively to the connecting rod 10 being adjustable as required, for example by a small lever 15 adjustably fixed by a ratchet to the lever 6. Alternatively, the distance between the two slides 7 could be varied.

The arrangement described could be completed by arranging the parts in such a way that transverse movements of the lever 6 produce variations in the opposite direction of the angle of incidence of each of two halves of at least one of the two aerofoils 2, 4.

To this end, for example, the connecting rod 10 is replaced by two connecting rods 10′, 10″, each controlling one of the two half-aerofoils 2′, 2″. The lower extremity of each of these connecting rods is connected to a beam 16 to which there is secured a toothed segment 17 engaging with a second segment 18 connected to the Cardan joint of the connecting rod 9 so as to participate in the angular transverse movements of the lever 6. The said sectors 17 and 18 are mounted on a support 19 carrying at its lower end the spindle 8, while the connecting rod 11 is connected thereto towards the rear.

By this means an arrangement is obtained ensuring lateral control (rolling) while at the same time permitting longitudinal control (pitching) and the said arrangement can also be realized with movable slides 7 by connecting them to the 6 in such a way that they move in opposite directions for transverse movements of the said lever and in the same direction for longitudinal movements.

Finally, the assembly could be completed, whether it is adapted for permitting rolling or not, by a vertical rudder 20 controlled, preferably, by the transverse movements of the lever 6, the connection between the said lever 6 and the rudder 20 being ensured by any suitable linkage, for example by an oblique guide 21 (Fig. 11).

As a result of the construction adopted, an assembly is obtained of which the operation and advantages follow sufficiently from the foregoing for it to be unnecessary to give any particular explanation thereof.

The invention further includes the following arrangement, which can be used either separately, or in combination with the features above described.

This last arrangement relates to flying machines including a wing the two halves of which, located on either side of the longitudinal plane of symmetry of the machine, can be given a variable incidence, the variations of incidence taking place either in the same direction for both of these wing elements (so as to produce pitching of the machine, in the same manner as with an elevator), or differentially, in opposite directions (so as to produce rolling of the machine on its longitudinal axis). This arrangement consists in devising the means for controlling the respective incidences of the wing elements in such manner that the maximum amplitude of the differential variations of incidence (producing rolling) permitted by said control means becomes more and more limited as the angle of incidence of the wing elements, both turned in the same direction for causing the nose of the machine to turn upwardly, is more considerable.

An embodiment of such an arrangement is illustrated by Figs. 12 and 13, given by way of example.

In this embodiment, the control stick 6 of the aeroplane, which is mounted through a Cardan joint on the aeroplane structure, is mechanically coupled with a connecting rod 9 the rear end of which carries a pin 8 adapted to slide in a curved slot 7. The mechanical connection between rod 9 and stick 6 is of such a nature that, in the course of the longitudinal (fore and aft) displacements of stick 6, rod 9 is caused to move forward and backward, while, for transverse displacements of the control stick, rod 9 pivots about its own axis.

At a suitable point of rod 9 there is fixed an equalizing bar 21 to either end of which there is pivoted, through a knuckle joint, a connecting rod 22′, 22″, adapted to control the incidence of the corresponding wing element. For this purpose, for instance, these connecting rods are pivotally connected, through knuckle joints, with levers 23′, 23″, themselves keyed on transverse spindles 24′, 24″, respectively, said spindles being journalled in the aeroplane structure. On these spindles are also keyed levers 25′, 25″, acting, through connecting rods 26′, 26″ either on the wing elements or on flaps hinged to said flap elements, respectively.

It will be readily understood that, with this arrangement, if slot 7 is given a suitable shape, it is possible to obtain, in the course of the longitudinal displacements of control stick 6, the desired law of variation of the incidence of the two wing elements both turned in the same direction. This will involve, if it is desired to obtain a law of variation of the incidence such as that shown at the lower part of Fig. 7, giving the intermediate part of slot 7 the shape of a circular arc substantially coaxial with spindles 24', 24''.

But, in order to obtain a differential variation of the incidences of the wing elements 2', 2'' (one of these wing elements being turned in one direction and the other in the opposite direction) for different longitudinal positions of control stick 6 (and therefore rod 9), when said stick is rotated in a transverse plane, the parts are arranged in such manner that angle α (made, in vertical projection as shown by Fig. 12, between connecting rod 9, on the one hand, and connecting rods 22', 22'', on the other hand) decreases as control stick 6 is being pulled rearwardly.

Preferably, the device is arranged in such manner that, when control stick 6 (and therefore rod 9) reaches the end of its rearward stroke, this angle α becomes zero or assumes a very low value, whereby, for this position of rod 9 a rotation of stick 6 in a transverse plane will produce no differential pivoting displacement of wing elements 2' and 2'', contrary to what takes place when, control stick 6 being in a front position, angle α is relatively large.

Thus the rolling effect (resulting from differential rotation of wing elements 2', 2'') will be more and more reduced as control stick 6 is being pulled rearwardly. Therefore, in case of flight with a very large angle of attack, there are little or no possibilities of causing the aeroplane to roll, which is very important for avoiding entering into a spin.

Of course, in this case also, control stick 6 may be operatively connected with the front wing, as above explained.

On the other hand, the steering rudder 20 may be coupled in such manner with control stick 6 that this rudder is turned in a predetermined direction when control 6 is inclined laterally in the same direction.

This connection between rudder 20 and control stick 6 may be devised either as above described with reference to Fig. 11, or in another way, for instance by means of levers and cables, as shown by Fig. 13.

The system which has just been described is such that, under normal conditions of flight and at high speeds, the lateral displacements of control stick 6 simultaneously produce a differential pivoting of wing elements 2' and 2'' and a rotation of the steering rudder in such manner as to ensure a correct turning of the aeroplane. On the contrary, in case of a steep climb of the aeroplane or when flying at very low speed, when control stick 6 is pulled rearwardly, such lateral displacements of said stick no longer produce a differential pivoting of wing elements 2', 2'' but merely a rotation of the steering rudder.

Of course, this system may be carried out in any specific manner, eventually different from that just above described.

It should also be well understood that a system of the kind of that just above described might be applied to aircrafts of a type different from those with which the present invention is more especially concerned, for instance to aircrafts of the usual type, that is to say including ailerons or the like carried by a main supporting surface and a steering rudder carried by the rear end of the fuselage.

The invention is not limited to the precise forms or details of construction described, as these may be varied to suit particular cases.

Having now particularly described and ascertained the nature of my said invention and in what manner the same is to be performed, I declare that what I claim is:

1. A flying machine which comprises, in combination, a frame, two aerofoils carried by said frame one behind the other, control means for varying the incidence of the first aerofoil, control means for varying the incidence of the second aerofoil, a single operating control member for simultaneously operating both of said control means, each of said control means including a plate provided with a curved slot and a pin slidable in said slot, one of the two last mentioned parts being carried by said frame and the other being interposed between said operating control member and the aerofoil connected with said control means, said slots being so shaped that, for at least a part of the range of variation of the incidence of the aerofoils, a reduction of the incidence of the rear aerofoil corresponds to an increase of the incidence of the front aerofoil.

2. A flying machine according to claim 1 further including means for adjusting the respective relative positions of said pins and the slotted plates with which they cooperate.

3. A flying machine according to claim 1 including a rod of variable length interconnecting these two pins and means for varying the length of said rod.

4. A flying machine according to claim 1 including a rod interconnecting each of these two pins and said operating control member, and adjusting means for varying the relative positions of said two rods.

5. A flying machine which comprises, in combination, a frame, at least one aerofoil, made of two portions located on either side of the longitudinal axis of said machine, carried by said frame, with variable respective incidences for said aerofoil sections, an operating control member for simultaneously actuating both of said aerofoil portions, transmission means, interposed between said control member and said aerofoil portions, said means including a plate provided with a curved slot and a pin slidable in said slot, one of these two last mentioned parts being carried by said frame and the other being interposed between said operating control member and said aerofoil so that displacements of said operating control member having at least one component parallel to a given plane cause said pin to slide in said slot, and means, including a part of said transmission means, operative by displacements of said operating control member having at least one component parallel to a different plane, for differentially operating said aerofoil portions so as to vary the respective incidences thereof in opposite directions.

6. A flying machine according to claim 10 in which the range of variation of incidence is considerably greater for the rear aerofoil than for the front aerofoil.

7. A flying machine according to claim 5 further including a rudder and means for operatively connecting said rudder with said transmission means.

8. A flying machine which comprises, in combination, a frame, at least one aerofoil, made of two portions, located on either side of the longitudinal plane of symmetry of the machine, respectively, carried by said frame, with variable respective incidences for said aerofoil portions, an operating control member, universally pivoted to said frame, a longitudinal rod movable with respect to said frame, means for coupling said rod with said control member devised in such manner that a longitudinal pivoting of said control member imparts a longitudinal movement to said rod, while a transverse pivoting of said control member imparts to said rod a rotary movement about its own axis, a vertical cam device for guiding the rear part of said rod, whereby longitudinal displacements of said rod are accompanied by pivoting displacements thereof about a horizontal line of said control member, a bar rigid with said rod at right angles thereto, two cranks journalled in said frame about a common axis at right angles to said rod, two crank pins for each of said cranks, means for operatively connecting one of said crank pins with the corresponding aerofoil portion, and a connecting rod universally jointed at one end to the other crank pin and at the other end to the corresponding end of said bar.

9. A flying machine according to claim 8 further including a rudder, and means for transforming transverse pivoting movements of said control member into pivoting movements of said rudder.

10. A flying machine comprising a frame, two aerofoils secured to said frame one behind and at a lower level than the other, the rear aerofoil being located within less than a half cord of the principal aerofoil from the front aerofoil, means for voluntarily and simultaneously varying the incidence of said aerofoils, said means including elements for reducing the incidence of the rear aerofoil and for simultaneously increasing the incidence of the front aerofoil at least within a part of the range of variation of the incidences of said aerofoils.

11. A flying machine comprising a frame, two aerofoils secured to said frame one behind and at a lower level than the other, the rear aerofoil being located within less than a half cord of the principal aerofoil from the front aerofoil, control means for voluntarily and varying the incidence of the front aerofoil, control means for voluntarily varying the incidence of the rear aerofoil, said control means including elements for reducing the incidence of the rear aerofoil and for simultaneously increasing the incidence of the front aerofoil at least for a part of the range of variation of the incidences of said aerofoils, and a single member for simultaneously operating both of said control means.

12. A flying machine according to claim 11 further including means for interconnecting said two control means and means for adjusting said interconnecting means.

13. A flying machine according to claim 11, said elements comprising a cam system, means for interconnecting said two control means and means for adjusting said interconnecting means.

14. A flying machine comprising a frame, at least one aerofoil secured to said frame and having two portions located on either side of the longitudinal plane of symmetry of said machine respectively, an operating member movably secured to said frame for simultaneously controlling the respective incidences of both of said portions, means for imparting two different kinds of movements to said member, said means including elements for transforming the first kind of movement of said member into variations of the incidences of said portions so as to increase one and simultaneously reduce the other, a mechanism for producing, at a given amplitude of movement of said member in the second direction, a lower amplitude of the differential variation of the incidences of said portions when both of said portions are given a great angle of incidence in the direction in which the nose of the machine turns upwardly, than when said portions are given a lower angle of incidence.

15. A flying machine comprising a frame, at least one aerofoil secured to said frame and having two portions located on either side of the longitudinal plane of symmetry of said machine respectively, an operating member movably secured to said frame for simultaneously controlling the respective incidences of both of said portions, means for imparting two different kinds of movement to said member, said means including elements for transforming the first kind of movement of said member into variations of the incidences of both of said portions in the same direction, elements for transforming the second kind of movement of said member into a differential variation of the incidences of said portions so as to increase one and simultaneously reduce the other, a mechanism for reducing the difference of the incidences of said two portions in proportion with an enlargement of the incidences in the direction in which the nose of the machine turns upwardly.

16. An aeroplane comprising a frame, two aerofoils secured to said frame one behind the other and at different levels, the rear aerofoil being located within less than a half cord from the front aerofoil, a control member, means actuated by said member for varying the angle of incidence of the front aerofoil at all movements of said member, and means interconnected with said first means so as to be simultaneously movable therewith for varying the angle of incidence of the rear aerofoil at only some of the movements of said member, the angle of incidence of said rear aerofoil being substantially invariable by movement of said member within a range pertaining to normal flight, the angle of incidence of the front aerofoil being increased and the angle of incidence of the rear aerofoil being considerably reduced by movement of said member within a range pertaining to descending flight, the angle of incidence of both aerofoils being reduced by movement of said member within a range pertaining to rapid forward flight.

HENRI MIGNET.